United States Patent
Adams et al.

(10) Patent No.: US 9,971,838 B2
(45) Date of Patent: *May 15, 2018

(54) MITIGATING SUBJECTIVELY DISTURBING CONTENT THROUGH THE USE OF CONTEXT-BASED DATA GRAVITY WELLS

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 14/627,791

(22) Filed: Feb. 20, 2015

(65) Prior Publication Data
US 2016/0246884 A1    Aug. 25, 2016

(51) Int. Cl.
G06F 17/30    (2006.01)
G06F 17/27    (2006.01)

(52) U.S. Cl.
CPC .... *G06F 17/30867* (2013.01); *G06F 17/2785* (2013.01)

(58) Field of Classification Search
None
See application file for complete search history.

(56) References Cited

U.S. PATENT DOCUMENTS

| 5,943,663 A | 8/1999 | Mouradian |
| 6,199,064 B1 | 3/2001 | Schindler |

(Continued)

FOREIGN PATENT DOCUMENTS

| EP | 1566752 A2 | 8/2005 |
| EP | 1843259 A2 | 10/2007 |
| WO | 2007044763 A2 | 4/2007 |

OTHER PUBLICATIONS

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

(Continued)

*Primary Examiner* — Farhan Syed
(74) *Attorney, Agent, or Firm* — Law Office of Jim Boice

(57) ABSTRACT

A processor-implemented method, system, and/or computer program product mitigate subjectively disturbing content. A context-based data gravity wells membrane supports one or more gravity wells, which hold subjectively disturbing synthetic context-based objects made up of a non-contextual data object, a first context object, and a second context object. The first context object defines the non-contextual data object, and the second context object describes how subjectively disturbing content generated by combining the non-contextual data object and the first context object is according to predefined parameters described by the second context object. New content is passed across the context-based data gravity wells membrane. Subjectively disturbing content from the new content is trapped by the context-based data gravity well in response to a non-contextual data object and context objects from the new content matching those of the context-based data gravity well, thereby reducing a level of subjective discomfort imposed by the new content.

20 Claims, 7 Drawing Sheets

(56) References Cited

U.S. PATENT DOCUMENTS

| | | | |
|---|---|---|---|
| 6,633,855 B1* | 10/2003 | Auvenshine | G06F 17/30 706/15 |
| 6,768,986 B2 | 7/2004 | Cras et al. | |
| 7,487,132 B2* | 2/2009 | Auvenshine | G06F 17/30 706/15 |
| 7,571,163 B2 | 8/2009 | Trask | |
| 7,748,036 B2 | 6/2010 | Speirs, III et al. | |
| 7,797,319 B2 | 7/2010 | Piedmonte | |
| 8,086,614 B2 | 12/2011 | Novy | |
| 8,150,882 B2 | 4/2012 | Meek et al. | |
| 8,620,958 B1 | 12/2013 | Adams et al. | |
| 8,856,946 B2 | 10/2014 | Adams et al. | |
| 8,914,413 B2* | 12/2014 | Adams | G06F 17/30607 707/740 |
| 8,931,109 B2 | 1/2015 | Adams et al. | |
| 9,286,388 B2* | 3/2016 | Marsh | G06F 17/30864 |
| 2002/0111792 A1 | 8/2002 | Cherny | |
| 2003/0088576 A1 | 5/2003 | Hattori et al. | |
| 2004/0019650 A1* | 1/2004 | Auvenshine | G06F 17/30 709/206 |
| 2005/0050030 A1 | 3/2005 | Gudbjartsson et al. | |
| 2005/0288961 A1* | 12/2005 | Tabrizi | G06Q 10/00 717/126 |
| 2006/0256010 A1 | 11/2006 | Tanygin et al. | |
| 2007/0033531 A1* | 2/2007 | Marsh | G06F 17/30864 715/738 |
| 2008/0281801 A1 | 11/2008 | Larson et al. | |
| 2009/0125546 A1 | 5/2009 | Iborra et al. | |
| 2009/0165110 A1 | 6/2009 | Becker et al. | |
| 2011/0282888 A1* | 11/2011 | Koperski | G06F 17/30864 707/752 |
| 2012/0131139 A1 | 5/2012 | Siripurapu et al. | |
| 2012/0209858 A1 | 8/2012 | Lamba et al. | |
| 2012/0221439 A1 | 8/2012 | Sundaresan et al. | |
| 2012/0259841 A1 | 10/2012 | Hsiao et al. | |
| 2012/0278897 A1 | 11/2012 | Ang et al. | |
| 2012/0281830 A1 | 11/2012 | Stewart et al. | |
| 2012/0290950 A1 | 11/2012 | Rapaport et al. | |
| 2013/0060696 A1 | 3/2013 | Martin et al. | |
| 2013/0103389 A1 | 4/2013 | Gattani et al. | |
| 2013/0311473 A1 | 11/2013 | Safovich et al. | |
| 2013/0326412 A1 | 12/2013 | Treiser | |
| 2014/0074833 A1 | 3/2014 | Adams et al. | |
| 2014/0074885 A1 | 3/2014 | Adams et al. | |
| 2014/0081939 A1 | 3/2014 | Adams et al. | |
| 2014/0184500 A1 | 7/2014 | Adams et al. | |
| 2014/0188887 A1* | 7/2014 | Adams | G06F 17/30607 707/740 |
| 2014/0188915 A1 | 7/2014 | Adams et al. | |
| 2014/0188960 A1 | 7/2014 | Adams et al. | |
| 2014/0344292 A1* | 11/2014 | Friedlander | G06F 17/10 707/752 |
| 2014/0258952 A1 | 12/2014 | Adams et al. | |
| 2016/0267546 A1* | 9/2016 | Marsh | G06F 17/30864 |

OTHER PUBLICATIONS

Visual Paradigm, "DB Visual Architect 4.0 Designer's Guide: Chapter 6—Mapping Object Model to Data Model and Vice Versa", 2007, pp. 6-2-6-26.

Avinash Kaushik, "End of Dumb Tables in Web Analytics Tools! Hello: Weighted Sort", Sep. 7, 2010, www.kaushik.net, pp. 1-15.

S. Alam et al., "Interoperability of Security-Enabled Internet of Things", Springer, Wireless Personal Communications, Dec. 2011, vol. 61, pp. 567-586.

U.S. Appl. No. 13/755,623—Notice of Allowance dated May 27, 2014.

List of IBM Patents or Patent Applications Treated as Related—Feb. 16, 2015.

* cited by examiner

US 9,971,838 B2

MITIGATING SUBJECTIVELY DISTURBING CONTENT THROUGH THE USE OF CONTEXT-BASED DATA GRAVITY WELLS

BACKGROUND

The present disclosure relates to the field of computers, and specifically to the use of computers in managing data. Still more particularly, the present disclosure relates to filtering data to remove potentially disturbing content.

SUMMARY

A processor-implemented method, system, and/or computer program product mitigate subjectively disturbing content. One or more processors generate a context-based data gravity well framework on a context-based data gravity wells membrane. The context-based data gravity wells membrane is a virtual membrane that is capable of logically supporting the context-based data gravity well framework. The context-based data gravity well framework supports a context-based data gravity well that holds at least one subjectively disturbing synthetic context-based object, which is made up of at least one non-contextual data object and a first context object and a second context object. The first context object defines the non-contextual data object, and the second context object describes how subjectively disturbing content generated by combining the non-contextual data object and the first context object is according to predefined parameters described by the second context object.

The processor receives new content from a content source. The new content includes both non-disturbing content and subjectively disturbing content. The subjectively disturbing content includes a new content non-contextual data object and a new content context object. The subjectively disturbing content is parsed into an n-tuple, which includes a pointer to the non-contextual data object in the context-based data gravity well and a pointer to the context object in the context-based data gravity well. The new content, with the parsed subjectively disturbing content, is passed across the context-based data gravity wells membrane, thus mitigating the subjectively disturbing content from the new content by selectively pulling parsed subjectively disturbing content from the new content into the context-based data gravity well. The parsed subjectively disturbing content is trapped by the context-based data gravity well in response to values from the parsed subjectively disturbing content's n-tuple matching the non-contextual data object and the context object in said context-based data gravity well, thereby reducing a level of subjective discomfort imposed on a viewer of the new content.

DETAILED DESCRIPTION

Figure 1:
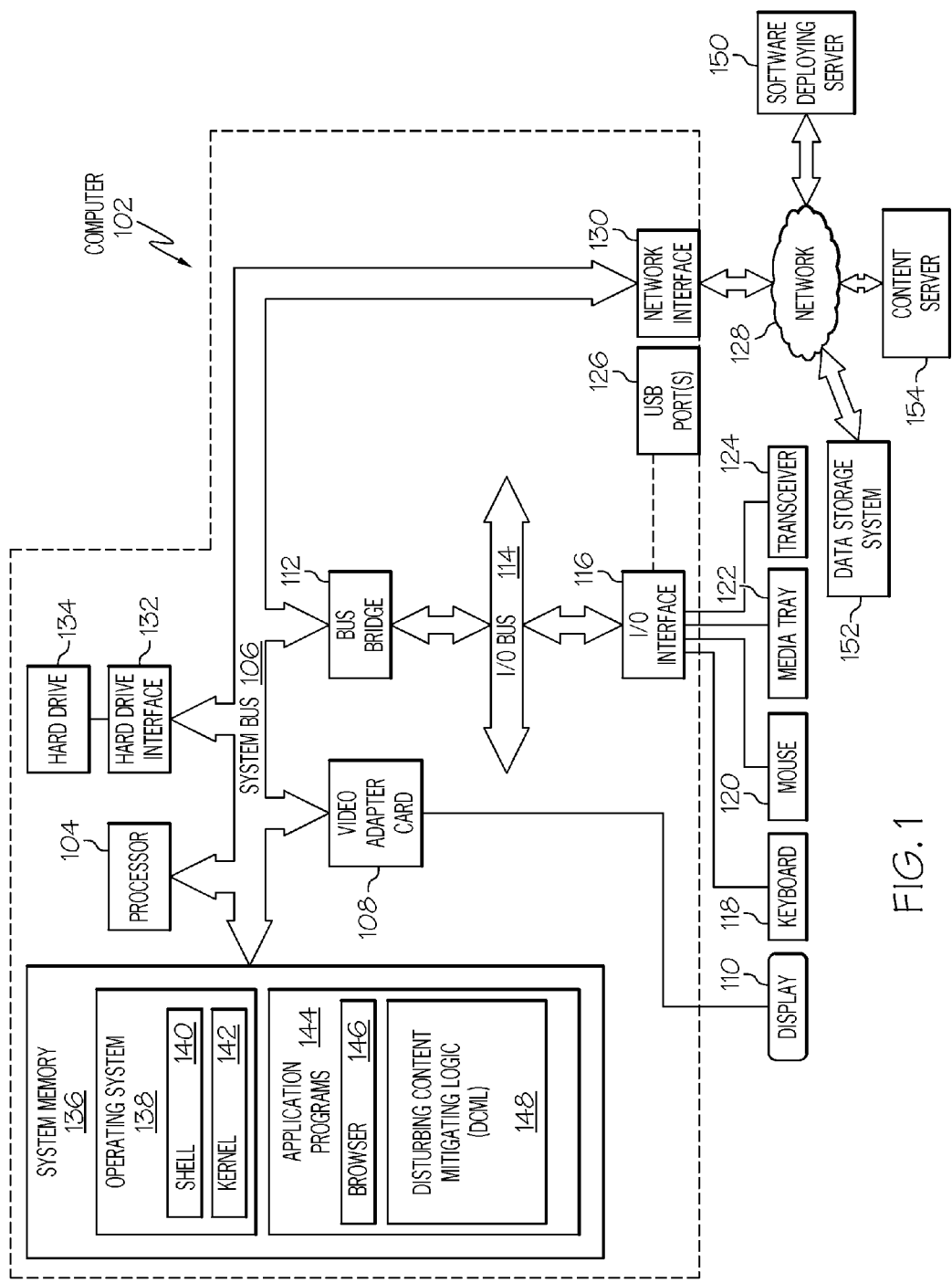
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or content server 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a disturbing content mitigating logic (DCML) 148. DCML 148 includes code for implementing the processes described below, including those described in FIGS. 2-8. In one embodiment, computer 102 is able to download DCML 148 from software deploying server 150, including in an on-demand basis, wherein the code in DCML 148 is not downloaded until needed for execution. In one embodiment of the present invention, software deploying server 150 performs all of the functions associated with the present invention (including execution of DCML 148), thus freeing computer 102 from having to use its own internal computing resources to execute DCML 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
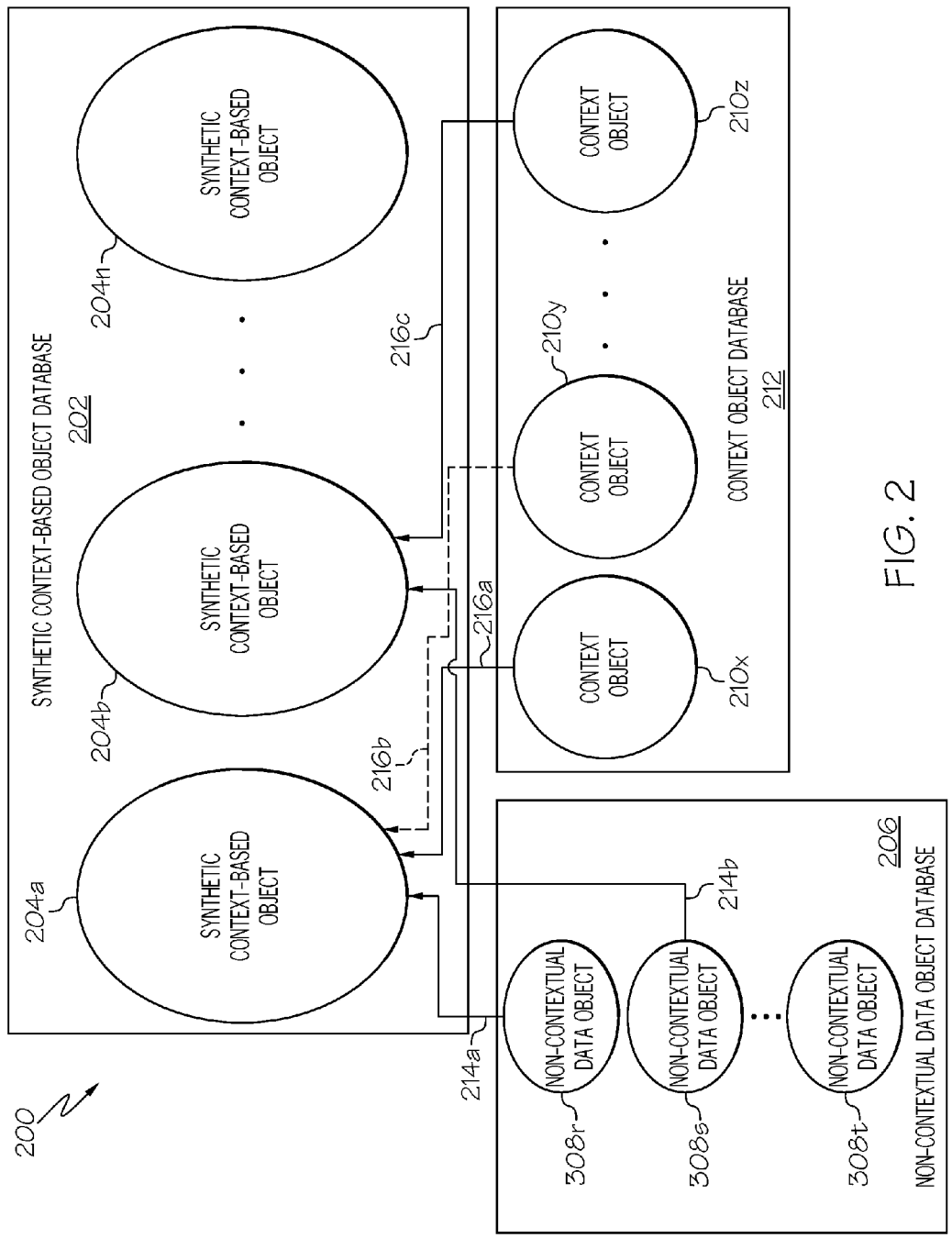
FIG. 2 illustrates a process for generating one or more synthetic context-based objects.

With reference now to FIG. 2, a process for generating one or more synthetic context-based objects in a system 200 is presented. System 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

The non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

More than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Although the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
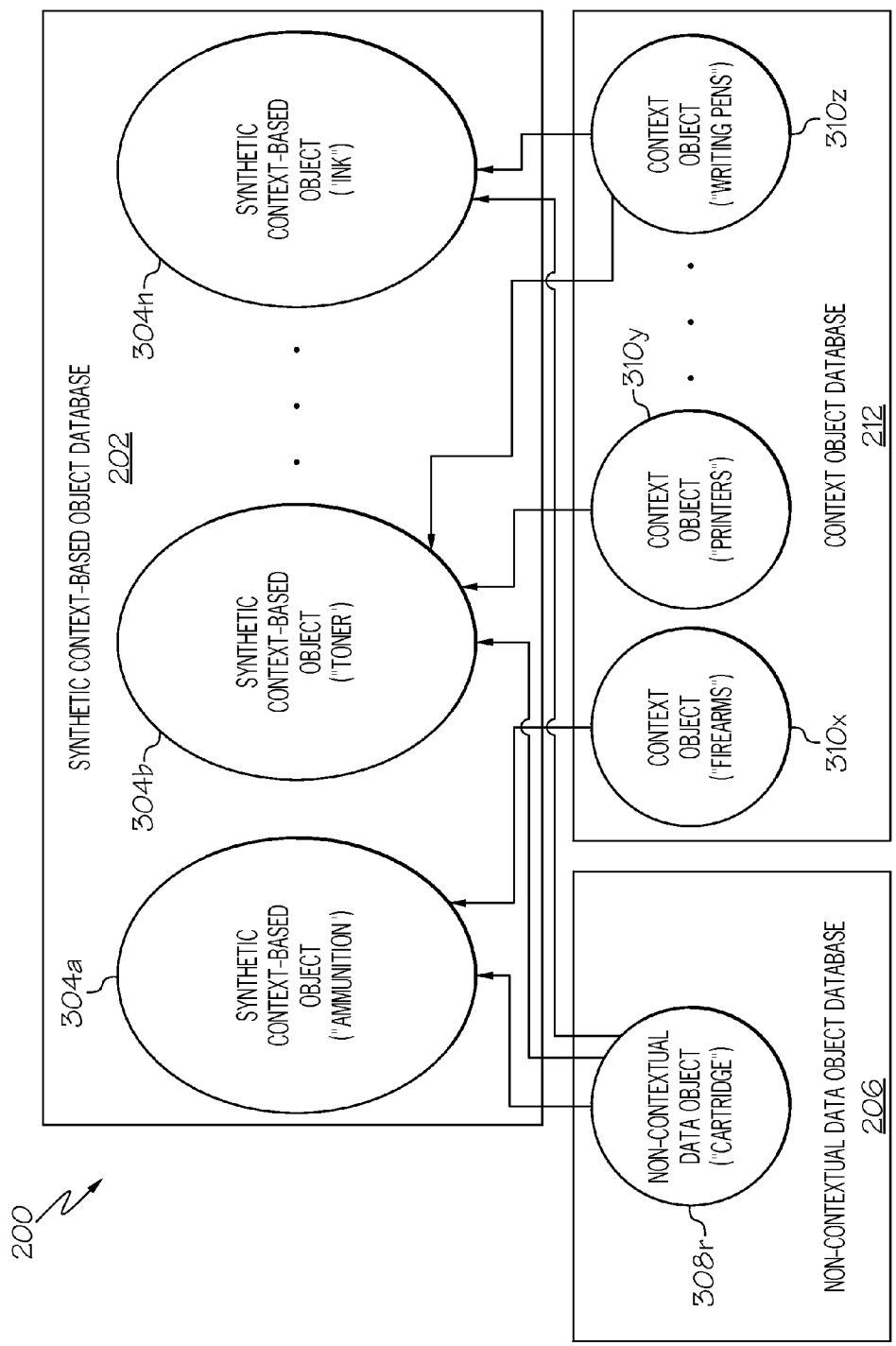
FIG. 3 depicts an exemplary case in which synthetic context-based objects are defined for the non-contextual data object datum "Cartridge"

Consider now an exemplary case depicted in FIG. 3, in which synthetic context-based objects are defined for the non-contextual datum object "cartridge". Standing alone, without any context, the word "cartridge" is meaningless, since it is ambiguous and does not provide a reference to any particular subject-matter. That is, "cartridge" may refer to ammunition for a firearm, toner for a printer, an ink cartridge for a writing pen, etc. Thus, each of these references is within the context of a different subject-matter (e.g., firearms, printers, writing pens, etc.).

In the example shown in FIG. 3, then, data (i.e., the word "cartridge") from the non-contextual data object 308r is associated with (e.g., stored in or associated by a look-up table, etc.) a synthetic context-based object 304a, which is devoted to the subject-matter "ammunition". The data/word "cartridge" from non-contextual data object 308r is also associated with a synthetic context-based object 304b, which is devoted to the subject-matter "toner" used in printers, as well as synthetic context-based object 304n, which is devoted to the subject-matter "ink" used by cartridge ink pens.

In order to give contextual meaning to the word "cartridge" (i.e., define the term "cartridge") in the context of "firearms", context object 310x, which contains the context datum "firearms", is associated with (e.g., stored in or associated by a look-up table, etc.) the synthetic context-based object 304a. That is, by combining the non-contextual data object 308r ("cartridge") with the context object 310x ("firearms"), the synthetic context-based object 304a (related to "ammunition" used in firearms) is created.

In order to give contextual meaning to the word "cartridge" in the context of "printers", context object 310y, which contains the context datum "printers", is associated with the synthetic context-based object 304a. That is, by combining the non-contextual data object 308r ("cartridge")

with the context object 310y ("printers"), the synthetic context-based object 304b (related to "toner" used by printers) is created.

In order to give contextual meaning to the word "cartridge" in the context of "writing pens", context object 310z, which contains the context datum "writing pens", is associated with the synthetic context-based object 304n. That is, by combining the non-contextual data object 308r ("cartridge") with the context object 310z ("writing pens"), the synthetic context-based object 304n (related to "ink" used by writing pens) is created.

Once a synthetic context-based object is created, it can be further augmented to create a subjectively disturbing synthetic context-based object. For example, assume that the synthetic context-based object 304a refers to ammunition used in a firearm. Some contexts would not find such firearm ammunition to be disturbing (i.e., causes consternation due to emotional reactions to the subject of firearm ammunition). For example, a hunter may consider firearm ammunition to simply be a tool of his/her sport. However, other contexts would find firearm ammunition to be quite disturbing. For example, if a recent shooting tragedy has occurred in a certain geographic location (e.g., a particular state, city, etc.), the mention of firearm ammunition may be deemed subjectively disturbing to persons in that geographic location.

Similarly, while certain persons may not be disturbed by content related to ammunition used in rifles and shotguns, ammunition used in handguns may be distressing. Even toy ammunition (e.g., caps used in a child's cap gun) may be disturbing to certain audiences.

Figure 4:
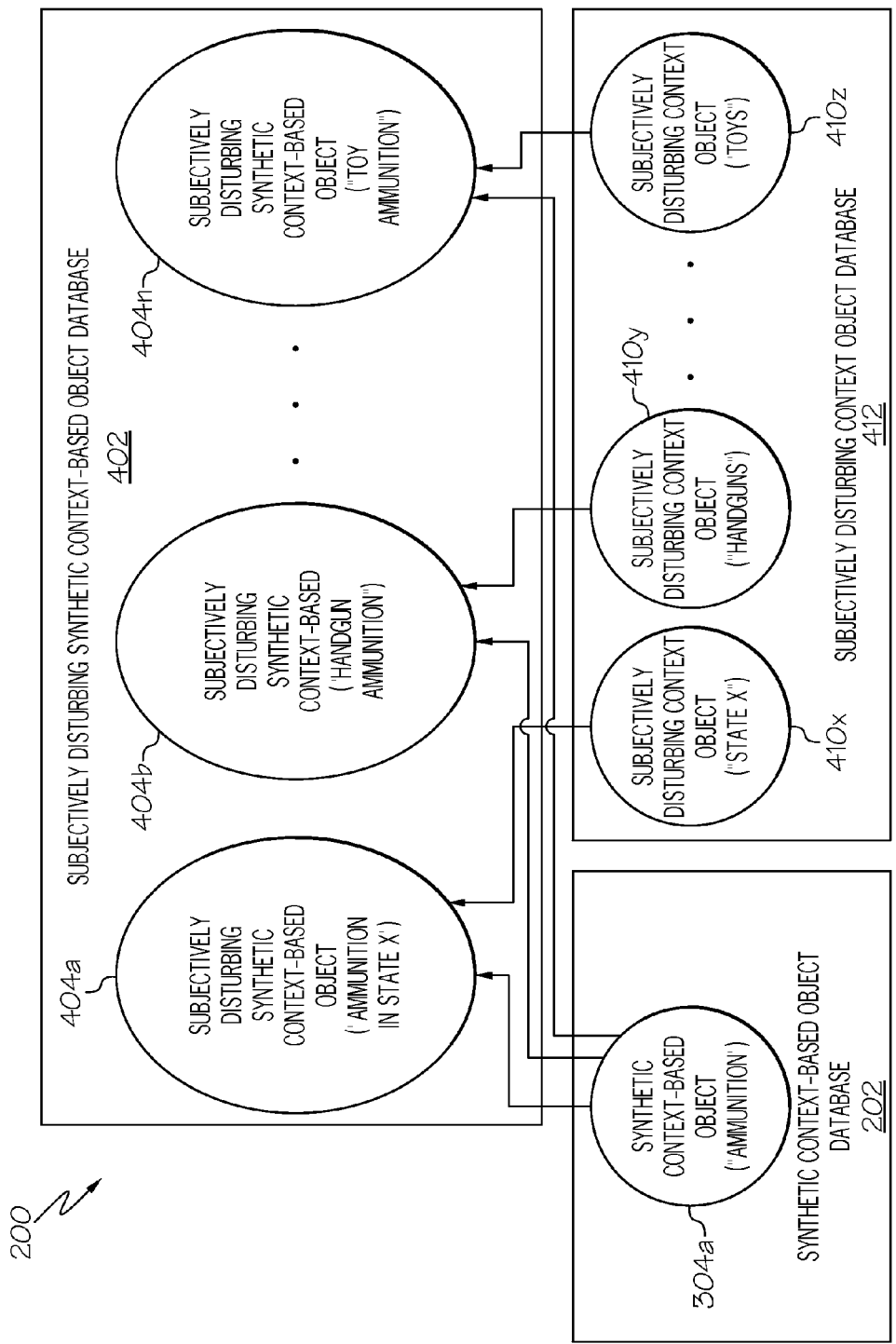
FIG. 4 illustrates additional context objects being applied to synthetic context-based objects.

Thus, as shown in FIG. 4, additional context objects are applied to synthetic context-based objects to create subjectively disturbing synthetic context-based objects. For example, assume that the subjectively disturbing context object 410x (identifying the geopolitical location "State X") is associated with the synthetic context-based object 304a (shown in FIG. 3) to generate the subjectively disturbing synthetic context-based object 404a, which relates to ammunition in State X. That is, an advertisement may offer ammunition for sale in a banner advertisement on a website. However, a recent shooting tragedy in State X may be causing residents of State X to be particularly sensitive to anything related to firearms, including offers to purchase ammunition. In order to mitigate this level of subjective discomfort caused by the mention of firearm ammunition in the banner advertisement, any dispatches of the advertisement banner to computers in State X may remove such offers, in an effort to reduce the subjective discomfort that the mention of firearm ammunition may cause. Similar mitigation may be applied to the banner advertisement if there was a recent rash of handgun violence (as defined by subjectively disturbing synthetic context-based object 404b—"handgun ammunition"), or if there was a recent rash of injuries to children from cap guns (as defined by subjectively disturbing synthetic context-based object 404n—"toy ammunition").

Figure 5:
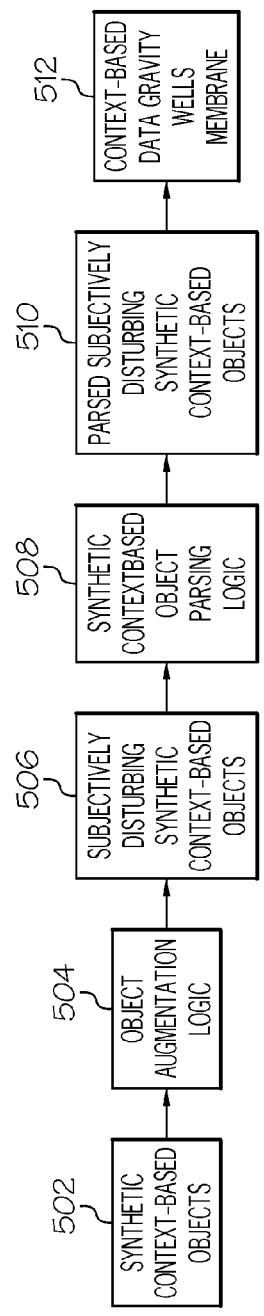
FIG. 5 depicts a process of preparing a data stream for passage over a context-based data gravity wells membrane.

With reference now to FIG. 5, a process of preparing a data stream for transmission to a context-based data gravity wells membrane in order to generate one or more data gravity wells on a context-based data gravity wells membrane is presented. A data stream of synthetic context-base objects 502 (e.g., synthetic context-based object 304a shown in FIG. 4) is initially received in a system (e.g., computer 102 shown in FIG. 1). An object augmentation logic 504 (e.g., part of DCML 148 shown in FIG. 1) will apply subjectively disturbing context objects (e.g., one or more of the subjectively disturbing context objects 410x-410z shown in FIG. 4) to the synthetic context based objects 502, thus creating subjectively disturbing synthetic context-based objects 506 (analogous to one or more of the subjectively disturbing synthetic context-based objects 404a-404n shown in FIG. 4).

In order to properly place the subjectively disturbing synthetic context-based objects 506 into a correct data well in the context-based data gravity well membrane 512, a synthetic context-based object parsing logic 508 (also part of DCML 148 in FIG. 1) parses the subjectively disturbing synthetic context-based objects 506 into parsed subjectively disturbing synthetic context-based objects 510. These parsed subjectively disturbing synthetic context-based objects 510 include both the context objects and non-contextual data objects that make up the subjectively disturbing synthetic context-based object, as well as an n-tuple (i.e., an ordered list of "n" descriptive elements, where "n" is an integer) generated from each of the subjectively disturbing synthetic context-based objects 506. In one embodiment, this n-tuple includes a pointer (e.g., a locating pathway) to the non-contextual data object in the synthetic context-based object. This pointer may be to a storage location (e.g., a universal resource locator (URL) address at which the non-contextual data object is stored), such that the subjectively disturbing synthetic context-based objects 506 must be generated, or the pointer may be local (such that the subjectively disturbing synthetic context-based objects 506 exist locally as part of a streaming data packet, etc.). Similar pointers also are found in the n-tuple for the context data objects within the subjectively disturbing synthetic context-based object.

In one embodiment, another of the parameters/values from the n-tuple is a subjective disturbance weight of the subjectively disturbing synthetic context-based object. For example, if the mention of firearm ammunition to a particular cohort (e.g., group of persons within a certain demographic region) is only mildly disturbing, then a lower weight (e.g., 1-3 on a scale of 1-10) would be assigned to the mention of firearm ammunition. However, if the mention of firearm ammunition to another cohort is highly disturbing, then a higher weight (e.g., 8-10 on the scale of 1-10) would be assigned to the mention of firearm ammunition.

Returning to FIG. 5, the parsed subjectively disturbing synthetic context-based objects 510 are then sent to a context-based data gravity wells membrane 512. The context-based data gravity wells membrane 512 is a virtual mathematical membrane that is capable of supporting multiple context-based data gravity wells. That is, the context-based data gravity wells membrane 512 is a mathematical framework that is part of a program such as DCML 148 shown in FIG. 1. This mathematical framework is able to 1) provide a virtual environment in which the multiple context-based data gravity wells exist; 2) populate the multiple context-based data gravity wells with appropriate synthetic context-based objects (e.g., those synthetic context-based objects having non-contextual data objects and context objects that match those found in the structure of a particular context-based data gravity well); and 3) support the visualization/display of the context-based data gravity wells on a display.

Figure 6:
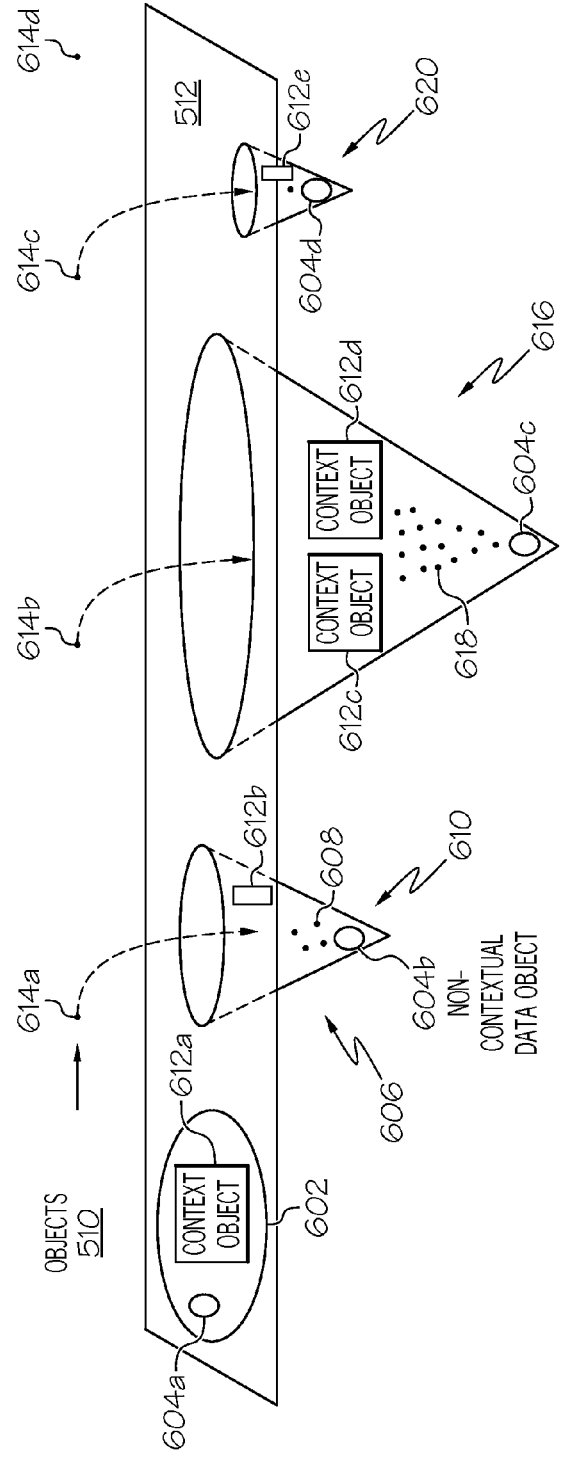
FIG. 6 illustrates subjectively disturbing synthetic context-based objects being selectively pulled into context-based data gravity well frameworks on a context-based data gravity wells membrane to generate context-based data gravity wells.

For example, consider FIG. 6, which depicts subjectively disturbing synthetic context-based objects 510 being selectively pulled into context-based data gravity well frameworks in order to define context-based data gravity wells. Context-based data gravity wells membrane 612 supports multiple context-based data gravity well frameworks.

For example, consider context-based data gravity well framework 602. A context-based data gravity well framework is defined as a construct that includes the capability of pulling data objects from a streaming data flow, such as subjectively disturbing synthetic context-based objects 510, and storing same if a particular subjectively disturbing synthetic context-based object contains a particular non-contextual data object 604a and/or a particular context object 612a (where non-contextual data object 604a and context object 612a are defined above). Context-based data gravity well framework 602 is not yet populated with any subjectively disturbing synthetic context-based objects, and thus is not yet a context-based data gravity well. However, context-based data gravity well framework 606 is populated with subjectively disturbing synthetic context-based objects 608, and thus has been transformed into a context-based data gravity well 610. This transformation occurs when context-based data gravity well framework 606, which contains (i.e., logically includes and/or points to) a non-contextual data object 604b and a context object 612b, both of which are part of each of the synthetic context-based objects 608 such as subjectively disturbing synthetic context-based object 614a, is populated with synthetic context-based objects from the streaming data flow.

Subjectively disturbing synthetic context-based objects 610, including subjectively disturbing synthetic context-based objects 614a-614c, are streaming in real-time from a data/content source across the context-based data gravity wells membrane 512. If a particular subjectively disturbing synthetic context-based object is never pulled into any of the context-based data gravity wells on the context-based data gravity wells membrane 512, then that particular subjectively disturbing synthetic context-based object simply continues to stream to another destination (or goes back to the original data/content source), and does not affect the size and/or location of any of the context-based data gravity wells.

Consider now context-based data gravity well 616. Context-based data gravity well 616 includes two context objects 612c-612d and a non-contextual data object 604c. The presence of context objects 612c-612d (which in one embodiment are graphically depicted on the walls of the context-based data gravity well 616) and non-contextual data object 604c within context-based data gravity well 616 causes synthetic context-based objects such as subjectively disturbing synthetic context-based object 614b to be pulled into context-based data gravity well 616. Context-based data gravity well 616 is depicted as being larger than context-based data gravity well 610, since there are more synthetic context-based objects (618) in context-based data gravity well 616 than there are in context-based data gravity well 610.

In one embodiment, the context-based data gravity wells depicted in FIG. 6 can be viewed as context relationship density wells. That is, the context-based data gravity wells have a certain density of objects, which is due to a combination of how many objects have been pulled into a particular well as well as the weighting assigned to the objects, as described herein.

In one embodiment, it is the quantity of synthetic context-based objects that have been pulled into a particular context-based data gravity well that determines the size and shape of that particular context-based data gravity well. That is, the fact that context-based data gravity well 616 has two context objects 612c-612d while context-based data gravity well 610 has only one context object 612b has no bearing on the size of context-based data gravity well 616. Rather, the size and shape of context-based data gravity well 616 in this embodiment is based solely on the quantity of synthetic context-based objects such as subjectively disturbing synthetic context-based object 614b (each of which contain a non-contextual data object 604c and context objects 612c-612d) that are pulled into context-based data gravity well 616. For example, context-based data gravity well 620 has a single non-contextual data object 604d and a single context object 612e, just as context-based data gravity well 610 has a single non-contextual data object 604b and a single context object 612b. However, because context-based data gravity well 620 is populated with only one subjectively disturbing synthetic context-based object 614c, it is smaller than context-based data gravity well 610, which is populated with four synthetic context-based objects 608 (e.g., four instances of the subjectively disturbing synthetic context-based object 614a).

In one embodiment, the context-based data gravity well frameworks and/or context-based data gravity wells described in FIG. 6 are graphical representations of 1) sorting logic and 2) data storage logic that is part of DCML 148 shown in FIG. 1. That is, the context-based data gravity well frameworks define the criteria that are used to pull a particular subjectively disturbing synthetic context-based object into a particular context-based data gravity well, while the context-based data gravity wells depict the quantity of subjectively disturbing synthetic context-based objects that have been pulled into a particular context-based data gravity well. In one embodiment, the original object from the stream of subjectively disturbing synthetic context-based objects 510 goes into an appropriate context-based data gravity well, with no copy of the original being made. In another embodiment, a copy of the original object from the stream of subjectively disturbing synthetic context-based objects 510 goes into an appropriate context-based data gravity well, while the original object continues to its original destination (e.g., a server that keeps a database of inventory of items at a particular store). In another embodiment, the original object from the stream of subjectively disturbing synthetic context-based objects 510 goes into an appropriate context-based data gravity well, while the copy of the original object continues to its original destination (e.g., a server that keeps a database of inventory of items at a particular store).

In one or more embodiments of the present invention, one or more context objects (e.g., context object 612b in FIG. 6) provide a basis for identifying how subjectively disturbing a context-based object is. For example and as described above in FIG. 4, the context object may be a subjectively disturbing context object that, when combined with a particular synthetic context-based object, creates a subjectively disturbing synthetic context-based object.

Once the context-based data gravity wells are defined (see FIG. 6), the resulting structure (i.e., context-based data gravity wells membrane 512) is used to filter out subjectively disturbing content from an n-tuple created from new content, in order to mitigate subjectively disturbing content. That is, once the context-based data gravity wells are defined and have populated the context-based data gravity wells membrane 512, these context-based data gravity wells can be used to filter out potentially disturbing matter from new content.

Figure 7:
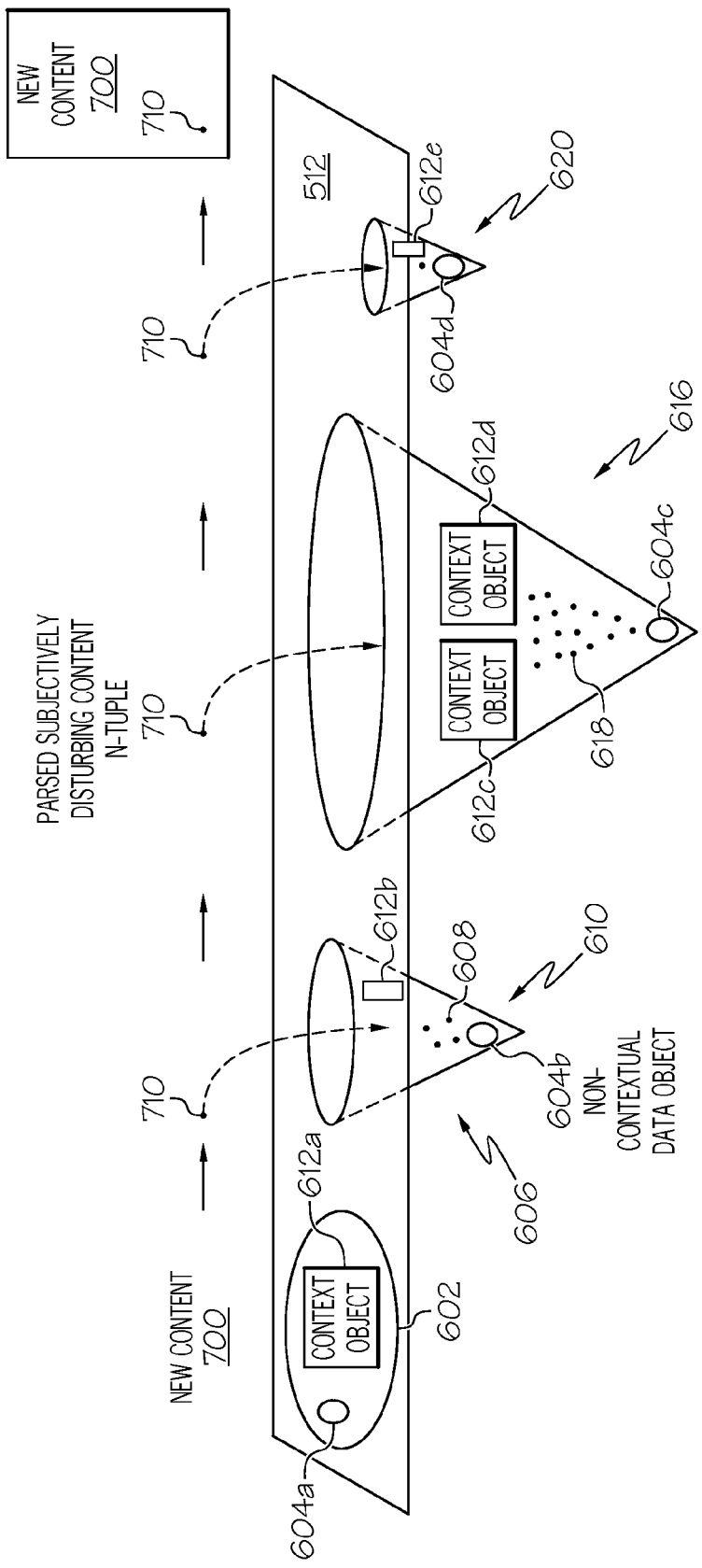
FIG. 7 depicts subjectively disturbing content from an n-tuple created by new content being pulled into context-based data gravity wells in order to mitigate subjectively disturbing content in the new content.

For example, as shown in FIG. 7, new content 700 is received from a content source, such as a text document, instructions to define how an object physically appears, a web banner, etc. The new content contains both subjectively non-disturbing and subjectively disturbing content. For example, a web banner may contain information describing the current time and date (which is subjectively non-disturbing), as well as an offer to purchase firearm ammunition (which subjectively may be disturbing, according to the recipient/viewer of the web banner). The new content 700 is parsed into an n-tuple following the same process discussed in FIG. 5 when preparing synthetic context-based objects for creating the gravity wells discussed above.

As shown in FIG. 7, the parsed subjectively disturbing content found in the n-tuple created from the new content is passed across the context-based data gravity wells membrane 512. Any subjectively disturbing content in the n-tuple that has context object(s) and non-contextual data object(s) that match those found in a particular data gravity well (e.g., subjectively disturbing synthetic context-based objects 608 in context-based data gravity well 610) are pulled into that particular data gravity well. The parsed subjectively disturbing content n-tuple 710 from the new content 700 passes across all gravity wells on the context-based data gravity wells membrane 512 until either it 1) is pulled into a particular gravity well, or 2) is not pulled into any gravity well, and thus remains intact within the new content 700. Thus, the context-based data gravity wells membrane 512 filters out any contextually disturbing content from the new content 700, thereby mitigating its effect.

Figure 8:
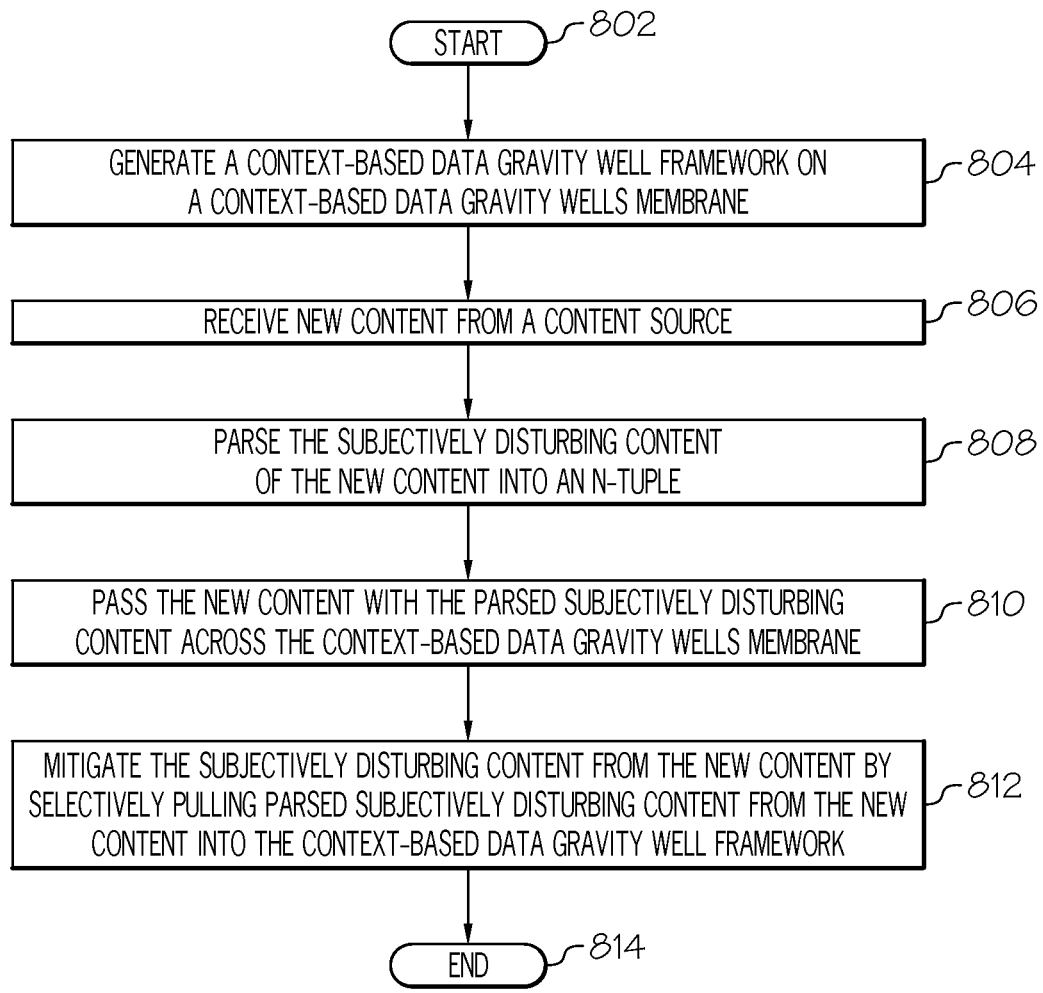
FIG. 8 is a high-level flow chart of one or more steps performed by a processor to mitigate subjectively disturbing content found in data.

With reference now to FIG. 8, a high-level flow chart of one or more steps performed by one or more processors to mitigating subjectively disturbing content. After initiator block 802, one or more processors generate a context-based data gravity well framework on a context-based data gravity wells membrane (block 804). As described in FIG. 6, one or more context-based data gravity well frameworks (e.g., context-based data gravity well framework 602 shown in FIG. 6) are deployed to a virtual membrane that is capable of logically supporting the context-based data gravity well framework (e.g., context-based data gravity wells membrane 512 shown in FIG. 6). The context-based data gravity well framework supports a data gravity well, which holds at least one subjectively disturbing synthetic context-based object. The subjectively disturbing synthetic context-based object includes at least one non-contextual data object and a first context object and a second context object. As described in FIG. 3, the first context object defines the non-contextual data object (e.g., non-contextual data object 308r in FIG. 3), which is meaningless without the context of the first context object (e.g., context object 310x in FIG. 3). As described in FIG. 4, the second context object (e.g., subjectively disturbing context object 410x in FIG. 4) describes how subjectively disturbing content generated by combining the non-contextual data object and the first context object is according to predefined parameters described by the second context object. For example, the second context object may describe a certain geopolitical area, whose residents would likely find the content of the synthetic context-based object to be disturbing to their personal feelings, positions, world view, morality, etc.

As described in block 806 in FIG. 8, one or more processors then receive new content (e.g., new content 700 in FIG. 7) from a content source (e.g., a text document, a webpage, a web banner, a document that describes and/or controls an appearance of a physical object, etc.). The new content includes both non-disturbing content and subjectively disturbing content. The subjectively disturbing content is made up of a new content non-contextual data object and a new content context object.

For example, assume that the new content is a text document that is authored by a person, and that the text document will be published to a particular audience. Within the text document are both innocuous (non-disturbing) text and potentially disturbing text. For example, the text document may be a report about Product X. The report may state that Product X has a suggested retail price of $10.00. Absent any issues over price gouging or other unusual circumstances, this information would be non-disturbing to any reader. However, the product report may also include the author's opinion that Product X is excellent, while a competitor's Product Y is unduly dangerous. If this opinion is not indisputable, then it is likely libelous, which would be disturbing to the legal department of the enterprise that makes Product Y (as well as the legal department of the enterprise that makes Product X). The present invention thus allows the non-disturbing matter (the price of Product X) to remain within the new content, while removing the disturbing matter (opinion about the competitor's Product Y) from the new content.

In another embodiment of the present invention, assume that the new content is text content that is generated by a computer program. For example, assume that a computer program is able to automatically generate a product brochure describing Product X. Information such as the weight and dimensions of Product X would never be disturbing. However, if the computer program also generated text stating that Product X would be useful when performing an activity for which it was not intended (i.e., some illegal activity), then this text would be disturbing both to the manufacturer of Product X as well as the reader of the text content. The present invention mitigates this problem.

In one embodiment of the present invention, the new content is not just text, but rather is software code that generates an appearance of a physical object, either as an image or as the physical object itself. For example, assume that this software code is used to design the appearance of a humanoid robot that physically resembles a human, or to design an appearance of an animated person in a cartoon/movie. A phenomenon known as "uncanny valley" states that if a robot looks nothing like a person (e.g., a welding "arm" used on an automobile assembly line), then there is nothing "creepy" about that robot (as subjectively experienced by a person looking at the robot). If a robot looks somewhat like a person (i.e., has two legs, two arms, a "head"), but still is clearly a machine (e.g., robots found in old science fiction movies), then a person looking at this robot also knows that it is a machine, and is not made uneasy by its appearance. At the other end of the spectrum, if a robot looks exactly like a person, then a person is able to suspend belief and comfortably pretend that the robot is a real person (particularly in animated movies). However, if a robot "doesn't look quite right" due to the shape of the robot's face, coloring of the robot's skin, movement of the robot, etc. that is not perfectly realistic, then the viewer is repulsed by the sight of the robot, due to the uncanny (i.e., eerie, unnatural) appearance of the robot.

In accordance with this embodiment of the present invention, physical features that cause an uncanny valley response are defined by the second context object described above. That is, the second context object may describe a particular shape of a face, a particular hue of skin, a particular walking gait, etc. displayed by a physical robot or by an animated person that is not natural, and thus is "uncanny". This second context object has been predetermined to be descriptive of traits that cause a disturbing response ("uncanny valley" response) in a viewer of the robot/animation. The present invention thus removes the code that 1) caused this physical trait to appear on the physical robot, or 2) caused this physical trait to appear on the animated figure.

For example, a piece of software code used in computer aided manufacturing (CAM) may instruct a 3-D printer to generate a cheekbone having certain dimension ratios. However, if such cheekbone shapes have been predetermined (e.g., by subjective polling of viewers) to be eerie, then the underlying code that was used to create this shape in the cheekbone is removed and/or replace with other code (that has been used to create a cheekbone that is not eerie to viewers). Similar code can be removed/modified in software code used in animation through the use of the present invention.

Returning now to FIG. 8, one or more processors then parse the subjectively disturbing content of the new content into an n-tuple, as described in block 808. In one embodiment, this n-tuple includes a pointer to at least one non-contextual data object in the context-based data gravity well framework and a pointer to said at least one context data object in the context-based data gravity well.

As described in block 810 of FIG. 8, one or more processors pass the new content with the parsed subjectively disturbing content across the context-based data gravity wells membrane, as described in FIG. 7.

As described in block 812 of FIG. 8, one or more processors are the able to mitigate the subjectively disturbing content from the new content by selectively pulling parsed subjectively disturbing content from the new content into the context-based data gravity well. The parsed subjectively disturbing content is thus trapped by the context-based data gravity well in response to values from the parsed subjectively disturbing content's n-tuple (e.g., the non-contextual object, the context object, etc.) matching at least one non-contextual data object and at least one context object in the context-based data gravity well. This process/mitigation thus reduces a level of subjective discomfort imposed on a viewer of the new content, as described herein.

The flow-chart in FIG. 8 ends at terminator block 814.

While the present invention has been described in one or more embodiments as generating/using an n-tuple that includes non-contextual objects and context object, in one embodiment the n-tuple (which is used as the basis for pulling content into a context-based data gravity well) also includes a content's "level of disturbance" that describes how disturbing certain content may be. For example, as described above, certain terms may be disturbing at a low level of 1-3 (on a scale of 1-10, where 1 is not disturbing at all, and 10 is extremely disturbing), a mid-level of 5-7, or a high level of 8-10. These levels can be determined from polling of past viewers, or by data mining of reports that describe what words/terms are deemed offensive/disturbing/eerie for certain demographic groups (i.e., certain ages, genders, geographic regions, etc.)

Thus, in one embodiment of the present invention, one or more processors receive ratings of levels of how disturbing the synthetic context-based object is for a particular demographic group (e.g., from questionnaires, data mining, etc.). The processors then apply these ratings to define a subjective disturbance weight of synthetic context-based object found in the context-based data gravity well. That is, certain synthetic context-based objects may be highly sensitive for readers/viewers, while others are not. Thus, the processor will populate the n-tuple with the subjective disturbance weight. Thereafter, parsed subjectively disturbing content from the new content is pulled by the processor into the context-based data gravity well framework based on the subjective disturbance weight in the n-tuple.

In an embodiment of the present invention, if subjectively disturbing content has been trapped by the context-based data gravity well framework, the one or more processors recommend a replacement content for that subjectively disturbing content that has been trapped. For example, assume that a phrase "asdflkj people" is a phrase that includes the offensive adjective "asdflkj", which may be any pejorative or other offensive word. The present invention can look up the pejorative term in a lookup table, and find that it is a synonym for the word "qwerpoiu", which is an adjective that is non-offensive to anyone. Thus, the term "asdflkj people" is automatically modified to read "qwerpoiu people".

As described herein, one or more embodiments of the present invention are directed to removing subjectively disturbing content from a text document. In various embodiments, this text document may actually be dynamic computer-generated dialogue. That is, a computer or computer-based device (e.g., a humanoid robot) may be involved in an interactive conversation with a person using voice recognition software to interpret what the person is saying, and voice generation software to create an aural display of what the computer is "saying". In one or more embodiments of the present invention, the "conversation" between the person and the computer (or humanoid robot) is dynamically adjusted using the presently-described invention, such that subjectively disturbing content generated by the computer is dynamically mitigated (e.g., removed or replaced with other wording).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of mitigating subjectively disturbing content, the processor-implemented method comprising:
   generating, by one or more processors, a context-based data gravity well framework on a context-based data gravity wells membrane, wherein the context-based data gravity well framework supports a context-based data gravity well that holds at least one subjectively disturbing synthetic context-based object, wherein said at least one subjectively disturbing synthetic context-based object comprises at least one non-contextual data object and a first context object and a second context object, wherein the first context object defines said at least one non-contextual data object, wherein the second context object describes how subjectively disturbing content generated by combining the non-contextual data object and the first context object is according to predefined parameters described by the second context object, and wherein the context-based data gravity wells membrane is a virtual membrane that is capable of logically supporting the context-based data gravity well framework;
   receiving, by one or more processors, new content from a content source, wherein the new content comprises non-disturbing content and subjectively disturbing content, wherein the subjectively disturbing content comprises a new content non-contextual data object and a new content context object;
   parsing, by one or more processors, the subjectively disturbing content of the new content into an n-tuple, wherein the n-tuple comprises a pointer to said at least one non-contextual data object in the context-based data gravity well and a pointer to said at least one context object in the context-based data gravity well;
   passing, by one or more processors, the new content with the parsed subjectively disturbing content across the context-based data gravity wells membrane; and
   mitigating, by one or more processors, the subjectively disturbing content from the new content by selectively pulling parsed subjectively disturbing content from the new content into the context-based data gravity well, wherein the parsed subjectively disturbing content is trapped by the context-based data gravity well in response to values from the parsed subjectively disturbing content's n-tuple matching said at least one non-contextual data object and said at least one context object in said context-based data gravity well, and wherein said mitigating reduces a level of subjective discomfort imposed on a viewer of the new content.

2. The processor-implemented method of claim 1, further comprising:
   receiving, by one or more processors, ratings of levels of how disturbing the subjectively disturbing synthetic context-based object is for a particular demographic group;
   applying, by one or more processors, the ratings to define a subjective disturbance weight for the subjectively disturbing synthetic context-based object; and
   populating, by one or more processors, the n-tuple with the subjective disturbance weight.

3. The processor-implemented method of claim 2, further comprising:
   selectively pulling, by one or more processors, the parsed subjectively disturbing content into the context-based data gravity well based on the subjective disturbance weight in the n-tuple.

4. The processor-implemented method of claim 1, further comprising:
   recommending, by one or more processors, a replacement content for the subjectively disturbing content that has been trapped by the context-based data gravity well.

5. The processor-implemented method of claim 1, wherein the new content is text content that is authored by a person.

6. The processor-implemented method of claim 1, wherein the new content is text content that is generated by a computer program.

7. The processor-implemented method of claim 1, wherein the new content is a generator of an appearance of a physical object, and wherein selectively pulling the parsed subjectively disturbing content into the context-based data gravity well removes an uncanny appearance in the physical object.

8. A computer program product for mitigating subjectively disturbing content, the computer program product comprising a computer readable storage medium having program code embodied therewith, wherein the computer readable storage medium is not a transitory signal per se, and wherein the program code is readable and executable by a processor to perform a method comprising:
   generating a context-based data gravity well framework on a context-based data gravity wells membrane, wherein the context-based data gravity well framework supports a context-based data gravity well that holds at least one subjectively disturbing synthetic context-based object, wherein said at least one subjectively disturbing synthetic context-based object comprises at least one non-contextual data object and a first context object and a second context object, wherein the first context object defines said at least one non-contextual data object, wherein the second context object describes how subjectively disturbing content generated by combining the non-contextual data object and the first context object is according to predefined parameters described by the second context object, and wherein the context-based data gravity wells membrane is a virtual membrane that is capable of logically supporting the context-based data gravity well framework;

receiving new content from a content source, wherein the new content comprises non-disturbing content and subjectively disturbing content, wherein the subjectively disturbing content comprises a new content non-contextual data object and a new content context object;

parsing the subjectively disturbing content of the new content into an n-tuple, wherein the n-tuple comprises a pointer to said at least one non-contextual data object in the context-based data gravity well framework and a pointer to said at least one context object in the context-based data gravity well framework;

passing the new content with the parsed subjectively disturbing content across the context-based data gravity wells membrane; and mitigating the subjectively disturbing content from the new content by selectively pulling parsed subjectively disturbing content from the new content into the context-based data gravity well framework, wherein the parsed subjectively disturbing content is trapped by the context-based data gravity well framework in response to values from the parsed subjectively disturbing content's n-tuple matching said at least one non-contextual data object and said at least one context object in said context-based data gravity well framework, and wherein said mitigating reduces a level of subjective discomfort imposed on a viewer of the new content.

9. The computer program product of claim 8, wherein the method further comprises:

receiving ratings of levels of how disturbing the subjectively disturbing synthetic context-based object is for a particular demographic group;

applying the ratings to define a subjective disturbance weight for the subjectively disturbing synthetic context-based object; and populating the n-tuple with the subjective disturbance weight.

10. The computer program product of claim 9, wherein the method further comprises:

selectively pulling the parsed subjectively disturbing content into the context-based data gravity well based on the subjective disturbance weight in the n-tuple.

11. The computer program product of claim 8, wherein the method further comprises:

recommending a replacement content for the subjectively disturbing content that has been trapped by the context-based data gravity well.

12. The computer program product of claim 8, wherein the new content is text content that is authored by a person.

13. The computer program product of claim 8, wherein the new content is text content that is generated by a computer program.

14. The computer program product of claim 8, wherein the new content is a generator of an appearance of a physical object, and wherein selectively pulling the parsed subjectively disturbing content into the context-based data gravity well removes an uncanny appearance in the physical object.

15. A computer system comprising:

a processor, a computer readable memory, and a non-transitory computer readable storage medium;

first program instructions to generate a context-based data gravity well framework on a context-based data gravity wells membrane, wherein the context-based data gravity well framework supports a context-based data gravity well that holds at least one subjectively disturbing synthetic context-based object, wherein said at least one subjectively disturbing synthetic context-based object comprises at least one non-contextual data object and a first context object and a second context object, wherein the first context object defines said at least one non-contextual data object, wherein the second context object describes how subjectively disturbing content generated by combining the non-contextual data object and the first context object is according to predefined parameters described by the second context object, and wherein the context-based data gravity wells membrane is a virtual membrane that is capable of logically supporting the context-based data gravity well framework;

second program instructions to receive new content from a content source, wherein the new content comprises non-disturbing content and subjectively disturbing content, wherein the subjectively disturbing content comprises a new content non-contextual data object and a new content context object;

third program instructions to parse the subjectively disturbing content of the new content into an n-tuple, wherein the n-tuple comprises a pointer to said at least one non-contextual data object in the context-based data gravity well and a pointer to said at least one context object in the context-based data gravity well;

fourth program instructions to pass the new content with the parsed subjectively disturbing content across the context-based data gravity wells membrane; and fifth program instructions to mitigate the subjectively disturbing content from the new content by selectively pulling parsed subjectively disturbing content from the new content into the context-based data gravity well, wherein the parsed subjectively disturbing content is trapped by the context-based data gravity well in response to values from the parsed subjectively disturbing content's n-tuple matching said at least one non-contextual data object and said at least one context object in said context-based data gravity well, and wherein said mitigating reduces a level of subjective discomfort imposed on a viewer of the new content; and wherein the first, second, third, fourth, and fifth are stored on the non-transitory computer readable storage medium and are executed by one or more processors via the computer readable memory.

16. The computer system of claim 15, further comprising:

sixth program instructions to receive ratings of levels of how disturbing the subjectively disturbing synthetic context-based object is for a particular demographic group;

seventh program instructions to apply the ratings to define a subjective disturbance weight for the subjectively disturbing synthetic context-based object;

eighth program instructions to populate the n-tuple with the subjective disturbance weight; and ninth program instructions to selectively pull the parsed subjectively disturbing content into the context-based data gravity well based on the subjective disturbance weight in the n-tuple; and wherein theسادس sixth, seventh, eighth, and ninth program instructions are stored on the non-transitory computer readable storage medium and are executed by one or more processors via the computer readable memory.

17. The computer system of claim 15, further comprising:

sixth program instructions to recommend a replacement content for the subjectively disturbing content that has been trapped by the context-based data gravity well;

and wherein the sixth program instructions are stored on the computer readable storage medium and are executed by one or more processors via the computer readable memory.

18. The computer system of claim 15, wherein the new content is text content that is authored by a person.

19. The computer system of claim 15, wherein the new content is text content that is generated by a computer program.

20. The computer system of claim 15, wherein the new content is a generator of an appearance of a physical object, and wherein selectively pulling the parsed subjectively disturbing content into the context-based data gravity well removes an uncanny appearance in the physical object.

* * * * *